UNITED STATES PATENT OFFICE 2,265,315

TETRANUCLEAR CONDENSATION PRODUCT AND PROCESS OF PREPARING THE SAME

Walter Salzer and Hans Andersag, Wuppertal-Elberfeld, Germany, assignors to Winthrop Chemical Company, Inc., New York, N. Y., a corporation of New York No Drawing. Application May 16, 1939, Serial No. 274,009. In Germany May 17, 1938

20 Claims. (Cl. 260—619)

This invention relates to new condensation products and to a process of preparing the same.

In accordance with the present invention 2-keto-1,2,3,4-tetrahydronaphthalenes which contain in the 1-position an alkyl group or a cyclically substituted alkyl group which group contains a reactive hydrogen atom at one of the carbon atoms 3 and 4 numbered from the carbon atom connected with the naphthalene radical, or substitution products of the compounds specified, can be converted to tricyclic and if the compounds contain the cyclically substituted alkyl group to tetracyclic condensation products when subjecting the said starting products to intramolecular condensation by means of a ringclosing-condensing agent. Such ringclosing-condensing agents are preferably highly concentrated sulfuric acid, for instance 98% concentrated sulfuric acid or 80% sulfuric acid which latter may be used together with an indifferent solvent, such as benzene; another suitable condensing agent is for instance phosphorus oxychloride. The condensation temperature is adapted to the particular condensing agent; when working with concentrated sulfuric acid the condensation is advantageously carried out at a temperature of 0 to 10° C., when using 80% sulfuric acid a temperature of 70 to 80° C. has proved suitable, when using phosphorus oxychloride short gentle heating is advisable. Thus, for instance, phenanthrene and benzoindene derivatives may be obtained; when using 2-keto-1,2,3,4-tetrahydronaphthalenes containing in the 1-position a phenylmethyl or substituted phenylmethyl group, benzofluorene compounds are obtained; chrysene compounds are formed when subjecting 2-keto-1,2,3,4-tetrahydronaphthalenes which contain in the 1-position a phenylethyl or substituted phenylethyl radical to the condensation.

The course of the reaction is most surprizing in view of the known fact, that the 2-keto-1,2,3,4-tetrahydronaphthalene has a great tendency to aromatization; it is for instance converted into naphthalene even on heating it to boiling while splitting off water.

The products thus obtainable are intended to be used for pharmaceutic purposes, if desired after further transformation of the substituents present. The condensation products containing alkoxy substituents, such as the methoxy and ethoxy group show particularly after splitting off the alkyl groups of the alkoxy substituents oestrus activity.

The starting materials above specified are obtainable by reacting upon a 2-keto-1,2,3,4-tetrahydronaphthalene in the presence of a strongly alkaline condensing agent and of a solvent which is inert to the starting materials with a phenyl-alkyl-halide.

The invention is illustrated by the following examples without being restricted thereto, the parts being by weight:

1 gram of 1-(beta-phenylethyl)-2-keto-1,2,3,4-tetrahydronaphthalene is treated with 5 ccs. of concentrated sulfuric acid at 0 to 10° C. After 5 minutes the reaction mixture is poured on to ice and the precipitated solid substance is dissolved in ether. Crystals of the 5,6,11,12-tetrahydrochrysene (numbering comp. "Annalen der Chemie" 311, page 257) melting at 105° C. are obtained. The reaction proceeds according to the following reaction scheme:

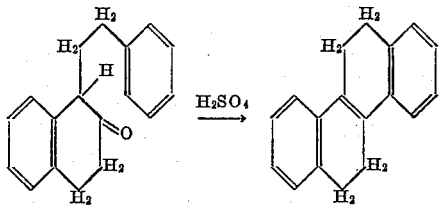

In an analogous manner the 3-methoxy-5,6,11,12-tetrahydrochrysene of the formula:

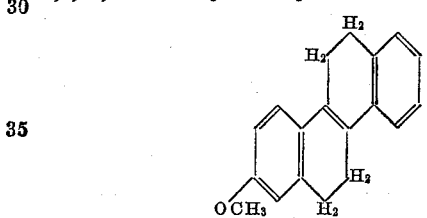

is obtained from alcohol in crystals melting at 91° C. from the 1-(beta-phenylethyl)-6-methoxy-2-keto-1,2,3,4-tetrahydronaphthalene; the 1,2-benzo-3,4-dihydro-5-(or 7-)-methoxyfluoren of the formula:

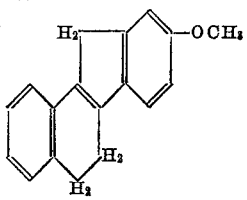

melting at 122° C. (from alcohol) is obtained from the 1-(3'-methoxybenzyl)-2-keto-1,2,3,4-tetrahydronaphthalene. The corresponding phenolic compound, the 1,2-benzo-3,4-dihydro-5- (or 7-)-hydroxyfluoren, is obtained by demethylating the methoxy compound by treatment with excess methyl magnesium iodide at 200° C.; it has a strong oestrus activity on the castrated female rat; crystals of the 3-methoxy-5,6,11,12-tetrahydrochrysene melting at 163° C. (from benzene) containing a further methoxy-group in 7- or 9-position and having in the latter case the formula:

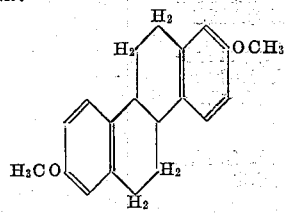

are obtained from 1-(beta-3'-methoxyphenylethyl)-6-methoxy-2-keto-1,2,3,4-tetrahydronaphthalene; the corresponding phenolic product, the 3-hydroxy-5,6,11,12-tetrahydrochrysene containing a further hydroxy group in 7- or 9- position, is obtained when demethylating the methoxy compound by means of methyl magnesium iodide; it melts at 215° C. and can be sublimated under 0.05 mm. pressure at 200° C.; it causes full oestrus even in small doses with the castrated rat.

We claim:

1. Condensation products of the polycyclic series in which the 1-position of a 3,4-dihydronaphthalene ring is connected by means of a bridge selected from the class consisting of —CH₂— and —CH₂—CH₂— with a benzene ring and the 2-position of the 3,4-dihydronaphthalene is directly connected with the benzene ring in ortho-position to said bridge.

2. 5,6,11,12-tetrahydrochrysenes.

3. 5,6,11,12-tetrahydrochrysenes which are substituted by substituents of the group consisting of hydroxy and methoxy groups.

4. 5,6,11,12-tetrahydrochrysenes which are substituted in 3-position and in one of the positions 7 and 9 by substituents of the group consisting of hydroxy and methoxy groups.

5. 1,2-benzo-3,4-dihydro-fluorenes.

6. 1,2-benzo-3,4-dihydro-fluorenes which are substituted by substituents of the group consisting of hydroxy and methoxy groups.

7. 1,2-benzo-3,4-dihydro-fluorenes which are substituted in one of the positions 5 and 7 by a substituent of the group consisting of hydroxy and methoxy groups.

8. The process which comprises subjecting a 2-keto-1,2,3,4-tetrahydronaphthalene which is substituted in 1-position by a phenylalkyl radical having a hydrogen atom at the phenyl radical in ortho-position to the alkyl radical to intramolecular condensation by means of a ringclosing-condensing agent.

9. The process which comprises subjecting a 2-keto-1,2,3,4-tetrahydronaphthalene which is substituted in 1-position by a phenylethyl radical having a reactive hydrogen atom at the phenyl radical in ortho-position to the ethyl radical, to intramolecular condensation by means of a ring-closing-condensing agent.

10. The process which comprises subjecting a 2-keto-1,2,3,4-tetrahydro-6-alkoxy-naphthalene which is substituted in 1-position by a phenylethyl radical having a reactive hydrogen atom at the phenyl radical in ortho-position to the ethyl radical, to intramolecular condensation by means of a ring-closing-condensing agent.

11. The process which comprises subjecting 1-phenylethyl-2-keto-1,2,3,4-tetrahydro-6-alkoxy-naphthalene to intramolecular condensation by means of a ringclosing-condensing agent.

12. The process which comprises subjecting 1-(beta-3'-alkoxyphenylethyl)-2-keto-1,2,3,4-tetrahydro-6-alkoxy-naphthalene to intramolecular condensation by means of a ringclosing-condensing agent.

13. The process which comprises subjecting 1-phenylethyl-2-keto-1,2,3,4-tetrahydro-6-alkoxy-naphthalene to intramolecular condensation by means of highly concentrated sulfuric acid.

14. The process which comprises subjecting 1-phenylethyl-2-keto-1,2,3,4-tetrahydro-6-methoxynaphthalene to intramolecular condensation by means of highly concentrated sulfuric acid.

15. The process which comprises subjecting 1-(beta-3'-alkoxyphenylethyl)-2-keto-1,2,3,4-tetrahydro-6-alkoxy-naphthalene to intramolecular condensation by means of highly concentrated sulfuric acid.

16. 3-hydroxy-5,6,11,12-tetrahydrochrysenes which are substituted in one of the positions 7 and 9 by a hydroxyl group.

17. 1,2-benzo-3,4-dihydrofluorenes which are substituted in one of the positions 5 and 7 by a hydroxyl group.

18. The process which comprises subjecting a 1-(3'-alkoxybenzyl)-2-keto-1,2,3,4-tetrahydronaphthalene to intramolecular condensation by means of a ringclosing-condensing agent.

19. The process which comprises subjecting a 1-(3'-alkoxybenzyl-2-keto-1,2,3,4-tetrahydronaphthalene to intramolecular condensation by means of highly concentrated sulfuric acid.

20. The process which comprises subjecting 1-(3'-methoxybenzyl)-2-keto-1,2,3,4-tetrahydronaphthalene to intramolecular condensation by means of highly concentrated sulfuric acid.

WALTER SALZER.
HANS ANDERSAG.